United States Patent [19]
Kelly

[11] Patent Number: 5,924,836
[45] Date of Patent: Jul. 20, 1999

[54] FOLDING AND TILTING TRAILER

[75] Inventor: Richard L. Kelly, Odessa, Mo.

[73] Assignee: Advanced Industries, Inc., Odessa, Mo.

[21] Appl. No.: 08/702,770

[22] Filed: Aug. 22, 1996

[51] Int. Cl.⁶ ..................................................... B60P 1/28
[52] U.S. Cl. .......................... 414/482; 414/462; 414/480; 414/537; 410/30; 280/402
[58] Field of Search .................... 414/537, 462, 414/480, 482; 280/402, 639; 410/9, 19, 30; 224/537, 571, 553, 924

[56] References Cited

U.S. PATENT DOCUMENTS

| | | |
|---|---|---|
| 76,856 | 4/1868 | Brangwin . |
| 2,803,362 | 8/1957 | Saenz . |
| 3,025,985 | 3/1962 | Crawford .................................. 414/537 |
| 3,740,074 | 6/1973 | Coil . |
| 3,892,321 | 7/1975 | Westbrook . |
| 3,901,398 | 8/1975 | Bunch .................................. 414/537 X |
| 3,912,098 | 10/1975 | Nicotra . |
| 3,921,842 | 11/1975 | Campbell . |
| 3,963,129 | 6/1976 | Clayton . |
| 4,034,872 | 7/1977 | Jager . |
| 4,222,698 | 9/1980 | Boelter . |
| 4,274,172 | 6/1981 | Franklin .................................. 414/537 X |
| 4,372,727 | 2/1983 | Fredrickson et al. .................................. 414/537 |
| 4,630,991 | 12/1986 | Landoll . |
| 4,836,737 | 6/1989 | Holmes . |
| 4,875,269 | 10/1989 | Crist . |
| 4,932,829 | 6/1990 | Miller . |
| 4,958,980 | 9/1990 | Holmes . |
| 5,033,931 | 7/1991 | Mann . |
| 5,061,147 | 10/1991 | Nespor . |
| 5,228,712 | 7/1993 | Speier . |
| 5,234,307 | 8/1993 | Scott . |
| 5,236,214 | 8/1993 | Taylor . |
| 5,570,898 | 11/1996 | Albert .................................. 280/639 X |
| 5,676,515 | 10/1997 | Haustein .................................. 414/537 |
| 5,707,203 | 1/1998 | Richter .................................. 414/537 X |

*Primary Examiner*—Stephen T. Gordon
*Attorney, Agent, or Firm*—Shook, Hardy & Bacon LLP

[57] ABSTRACT

A trailer having a front section and rear section connected with hinges is disclosed. The front section of the trailer comprises a front bed section mounted to a front frame section having a tongue extending therefrom. The rear section of the trailer comprises a rear bed section mounted to a rear frame section resting on a wheeled axle. A first pair of hinges detachably connects the front and rear sections of the trailer at the top of upwardly extending sides of the bed sections. A second pair of hinges detachably connects the frame sections of the front and rear sections of the trailer below the bed. The rear section of the trailer may be rotated downwardly with respect to the front to form a ramp, or the front rotated over the rear to shorten the overall length of the trailer for storage.

19 Claims, 4 Drawing Sheets

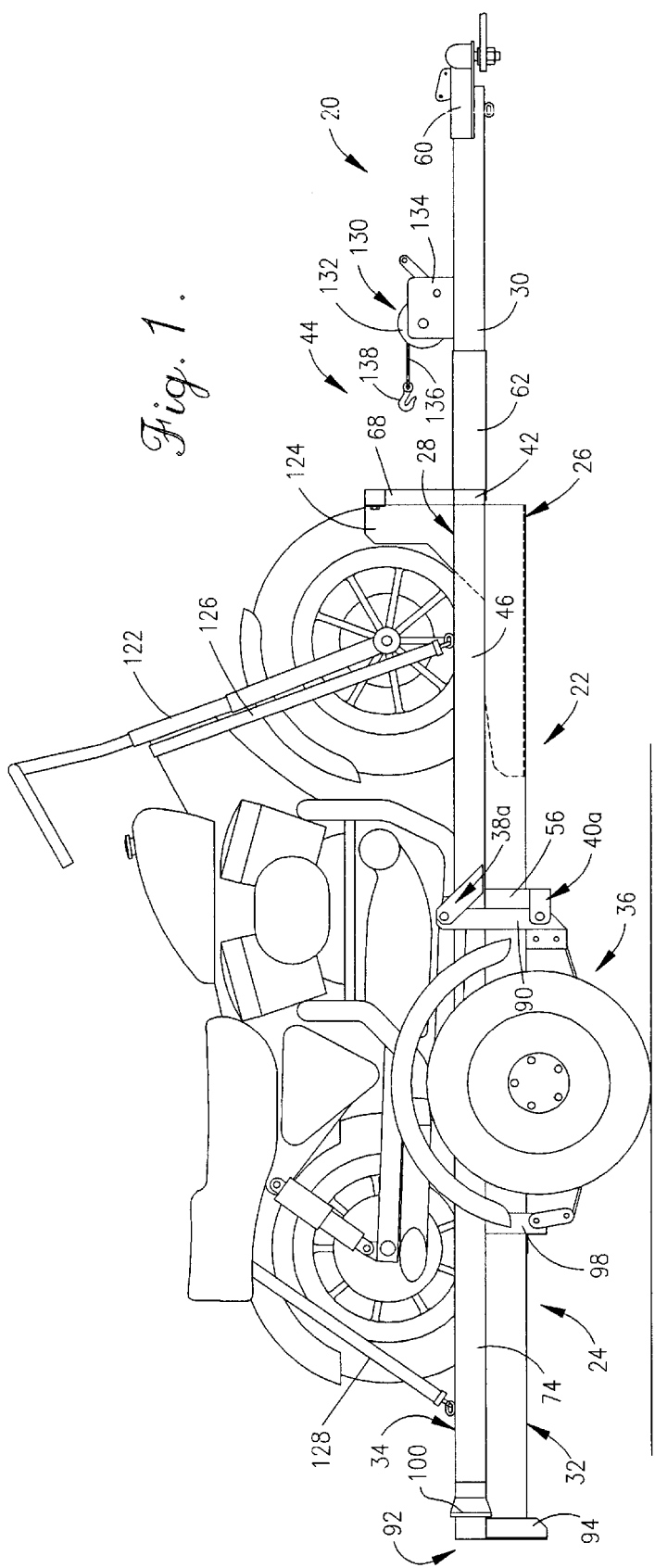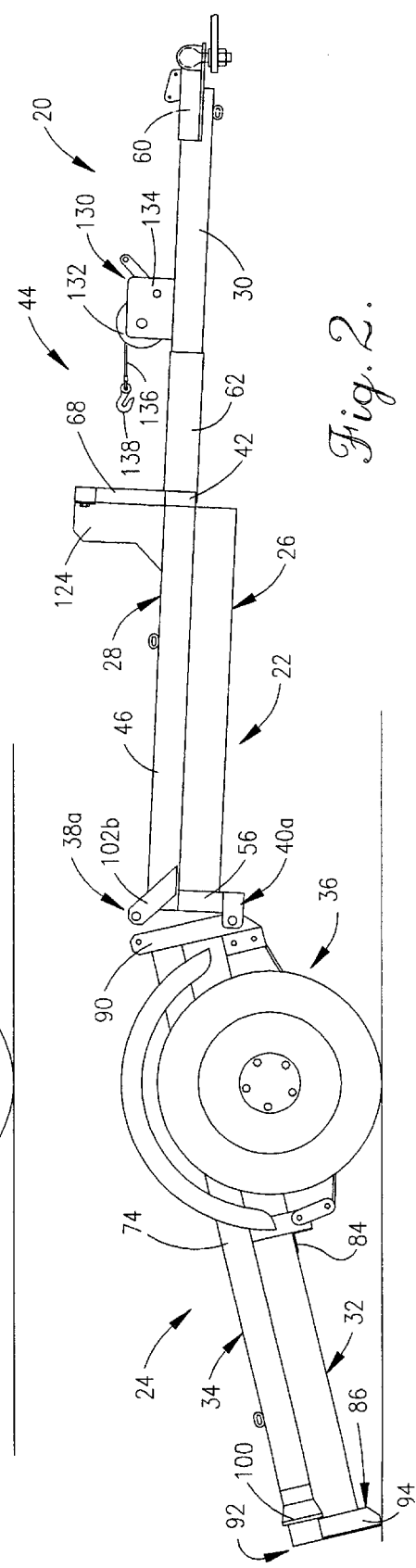

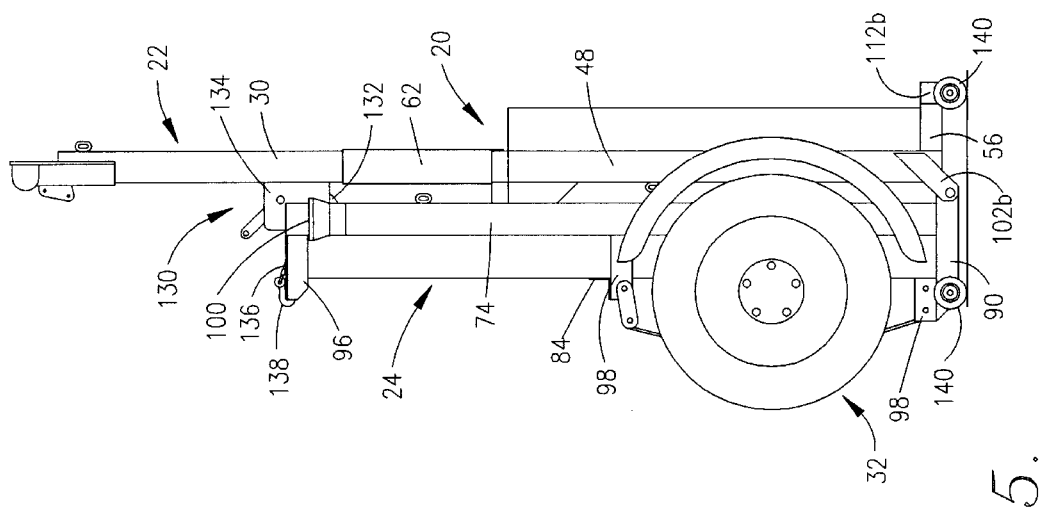
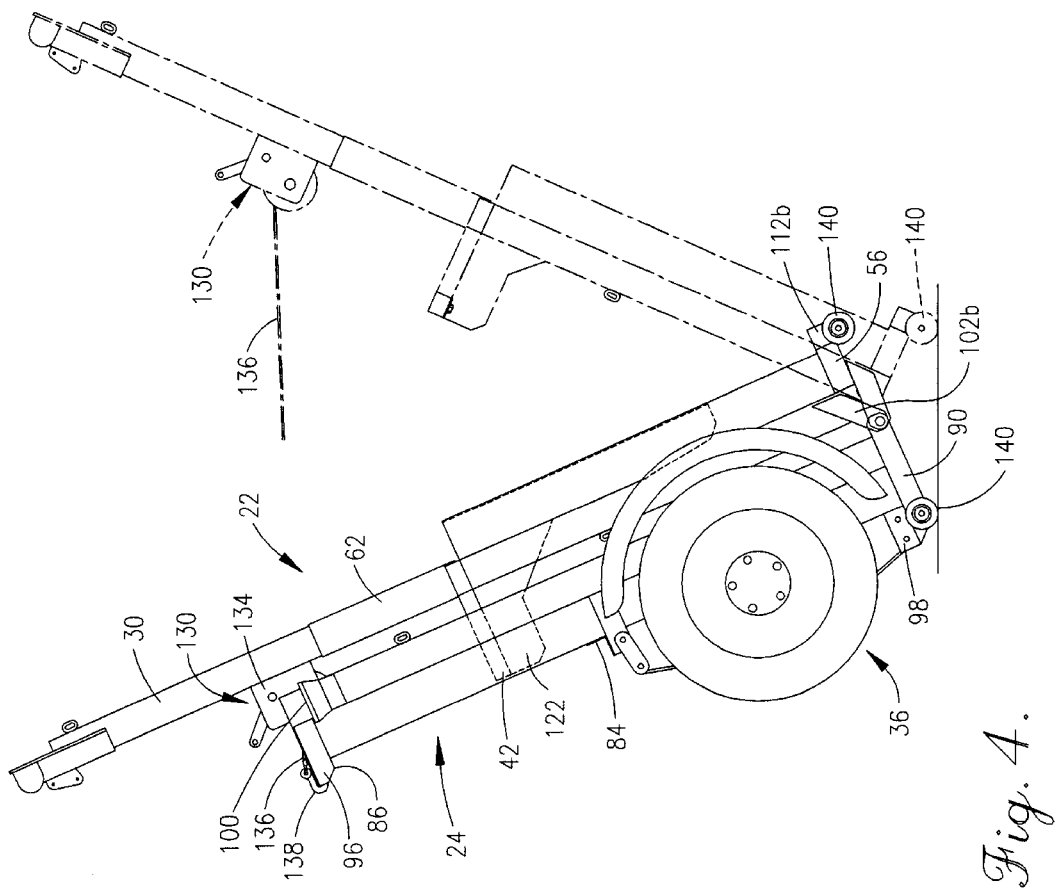
Fig. 5.
Fig. 4.

FOLDING AND TILTING TRAILER

FIELD OF THE INVENTION

The present invention relates to a trailer. More particularly, the invention is a trailer which has front and rear sections hingedly connected, whereby the rear section of the trailer may be tilted down with respect to the front section or the front section folded over the rear section.

BACKGROUND OF THE INVENTION

Trailers for use in hauling items ranging from lawn equipment, motorcycles, all-terrain vehicles, personal watercraft, to household goods and the like come in a variety of shapes and sizes. All of these trailers, however, generally have the same basic configuration of a trailer bed connected to a frame. An elongate tongue extends from one end of the frame, and a wheeled axle is connected to the frame under the trailer bed. The elongate tongue is supported at its end through a connection to the vehicle towing the trailer.

One common problem owners of trailers have is their storage. Even small trailers which are designed for towing motorcycles, lawn equipment, boats or the like may be ten to twenty feet or more in length. For a normal homeowner, the length of the trailer may prohibit storage of the trailer in the garage, or at least will force him to displace his car from the stall of the garage where he parks the trailer. If the owner does not wish to do this, he must park the trailer outside alongside his house or pay for commercial storage of it.

Another problem associated with trailers is apparent during their use. Because the trailer bed is positioned on the frame over the axles, the trailer bed is some distance off of the ground. As a result, it is often difficult to get items from the ground onto the trailer bed or from the trailer bed to the ground.

Most commonly, the user either lifts the item onto or off of the trailer bed or extends one or more ramps between the ground and the trailer bed and slides or rolls the item up or down the ramp. If the item is extremely heavy, lifting the item is often not an option. On the other hand, the use of ramps is inconvenient. First, the user must have ramps available. Second, the use of the ramps normally requires the trailer to be located on a flat section of ground. When the trailer is to be moved with the item on it, the user must also transport the ramps to the new destination for their use in unloading the item.

A trailer which is conveniently stored when not in use and which is adapted for easy loading and unloading is desired.

SUMMARY OF THE INVENTION

The present invention is an improved trailer. The trailer has a front section and a rear section hingedly connected to one another on opposite sides of a part line.

The hinged nature of the trailer allows a user to utilize the trailer in one of three main positions. First, the user may tilt the rear section of the trailer downwardly with respect to the front section, the rear section forming a ramp between the ground and the front section. Second, the user may fold the front section of the trailer over the rear section, whereby the total length of the trailer is significantly shortened for storage. Lastly, the user may join the front and rear sections of the trailer so as to form a unitary trailer bed for hauling items.

The front section of the trailer of the present invention comprises a front bed section connected to a front frame section. A tongue extends forwardly from the front frame section. The rear section of the trailer of the present invention comprises a rear bed section connected to a rear frame section. The rear frame section is mounted over a wheeled axle.

The front and rear sections of the trailer are joined with pairs of hinges. A first or top pair of hinges detachably and rotatably join the front and rear sections of the trailer at the top of upwardly extending side walls of the bed sections. A second or bottom pair of hinges join the front and rear sections of the trailer at a portion of the frame sections below the bed sections. Each hinge comprises a pin for engagement with a passage through a pair of flanges extending from one section and a passage through a column positioned between the flanges mounted on the other section.

When the pins of all of the hinges are engaged, the front and rear sections of the trailer are securely joined, forming a contiguous trailer. When a user removes the pins from the first or top pair of hinges, the rear section of the trailer may pivot downwardly with respect to the front section about the second pair of hinges. When a user removes the pins from the second or bottom pair of hinges, the user may pivot the front section of the trailer over the rear, thus shortening the total length of the trailer for storage.

The trailer preferably includes a winch mounted on the tongue. The winch includes a cable for connection to the rear end of the trailer for use in moving the trailer between its various configurations. Selectively attachable wheels are provided for connection to the trailer when the front section of the trailer is being folded over the rear. The wheels facilitate folding of the trailer, and allow a user to easily move the folded trailer when in its vertical position.

Further objects, features, and advantages of the present invention over the prior art will become apparent from the detailed description of the drawings which follows, when considered with the attached figures.

DESCRIPTION OF THE DRAWINGS

FIG. 1 is a side view of a trailer of the present invention comprising mating front and rear sections as utilized to haul a motorcycle;

FIG. 2 is a side view of the trailer of FIG. 1 illustrated in a position in which the rear section is rotated downwardly with respect to the front section;

FIG. 4 is a view of the trailer of FIG. 3 illustrating the trailer after the front section has been folded upwardly a greater distance towards the rear section and the entire trailer is supported on the newly added wheels;

FIG. 5 is a side view of the trailer of FIG. 4, illustrated in its completely folded position supported on the wheels.

DETAILED DESCRIPTION OF THE PREFERRED EMBODIMENT

Figure 3:
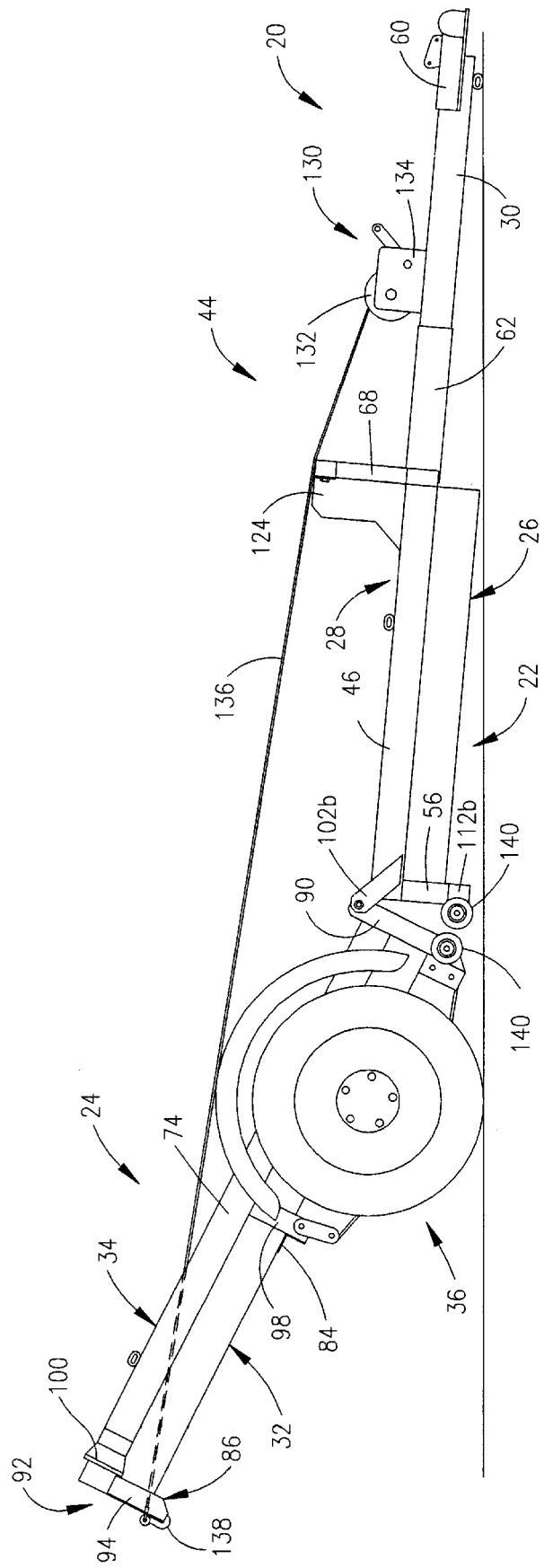
FIG. 3 is a side view of the trailer of FIG. 1, illustrating the trailer in a position in which the front and rear sections are slightly separated and wheels have been added.

FIG. 1 illustrates a trailer 20 in accordance with the present invention. In general, the trailer 20 of the present invention comprises a bed mounted to a frame, the trailer divided by a part line into a front trailer section 22 and a rear trailer section 24. The front and rear trailer sections 22,24 are movably connected to one another.

The front trailer section 22 comprises a front bed section 26 mounted to a front frame section 28. An elongate tongue 30 extends forwardly of the front frame section 28 for engagement with a towing vehicle.

The rear trailer section 24 comprises a rear bed section 32 mounted to a rear frame section 34. The rear frame section 34 is positioned over a wheeled axle 36.

Figure 6:
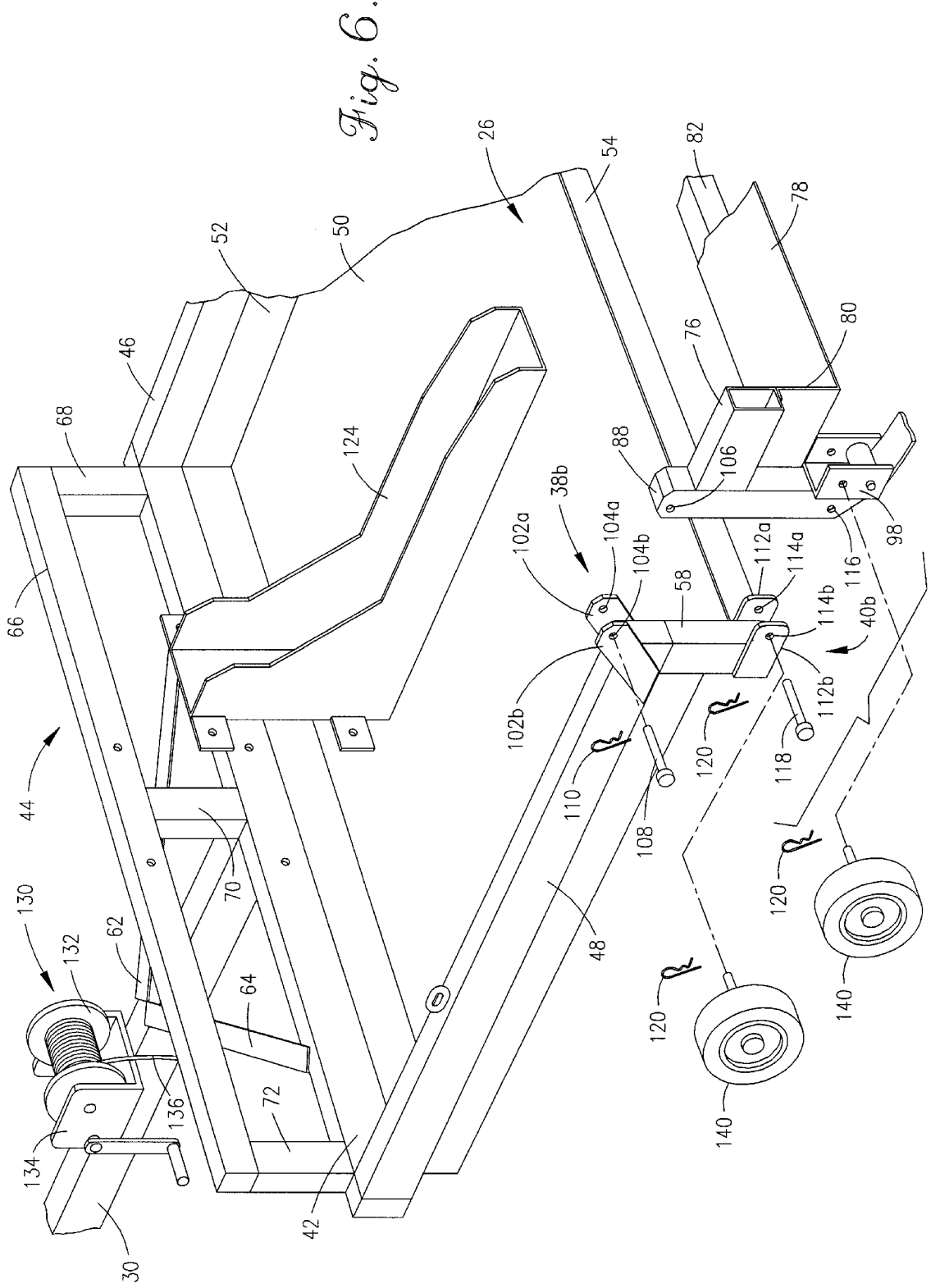
FIG. 6 is an exploded and enlarged partial perspective view of the trailer of the present invention.

A first or top pair of hinges 38a,b (only one of which is shown in FIGS. 1 and 2, the other positioned on the opposite side of the trailer 20, as illustrated in FIG. 6) detachably and rotatably connects the bed sections 26,32 of the front and rear sections 22,24 of the trailer along the top of a wall thereof at the part line. Likewise, a second or bottom pair of hinges 40a,b (only one of which is shown in FIGS. 1 and 2, the other being positioned on the opposite side of the trailer 20, as illustrated in FIG. 6) detachably and rotatably connects the frame sections 28,34 of the front and rear sections 22,24 of the trailer below the bed sections at the part line.

When the first and second pairs of hinges 38a,b, 40a,b are connected, the front and rear sections 22,24 form a contiguous trailer 20 having a bed for transporting items by a towing vehicle.

A user of the trailer of the present invention may disconnect the first pair of hinges 38a,b, allowing the rear section 24 of the trailer 20 to rotate downwardly with respect to the front section 22 of the trailer as illustrated in FIG. 2. In this position, the rear section 24 of the trailer 20 forms a ramp for loading and unloading of items.

Alternatively, the user may detach the second pair of hinges 40a,b, allowing the user to rotate the front section 22 of the trailer 20 over the rear section 24, as illustrated in FIGS. 3 and 4 and 5. In this position, the overall length of the trailer 20 is significantly shortened for convenient storage.

The trailer 20 of the present invention will now be described in more detail in conjunction with FIGS. 1–6. As best illustrated in FIG. 6, the front frame section 28 includes a supporting front rail 42 which is about 40–60, and most preferably about 52, inches long. The front rail 42 extends across a front end 44 of the trailer 20. Side rails 46,48 extend rearwardly from the ends of the front rail 42. The side rails 46,48 preferably extend about 40 inches rearward of the front rail 42. All of the rails 42,46,48 may be constructed of metal tube, such as 3 inch by 1.5 inch rectangular tubing.

The front bed section 26 includes a generally flat support 50 connected to the rails 42,46,48. The support 50 is preferably a section of flat metal plate having a width equal to the spacing of the side rails 46,48 and approximately the same length thereas. The front bed section 26 also includes a wall 52 which extends upwardly from the flat support 50 up to the rails 42,46,48. Preferably, the wall 52 is about 4 inches tall, whereby the surface 50 is positioned the same distance below the rails 42,46,48. The wall 52 may be formed with the support 50 or formed separately and connected thereto. The wall 52 is joined, such as by welding, screws or means of attachment to the rails 42,46,48.

In order to provide added support of the flat support 50 at a rear end of the front section 22 of the trailer 20, a strut 54 preferably spans the bottom of the surface 50. The strut 54 is a section of 2 inch by 2 inch "L"-shaped metal having a length sufficient to span the distance between the side rails 46,48.

The ends of the strut 54 are connected to the side rails 46,48 via support columns 56,58 (see also FIGS. 1 and 2). The support columns 56,58 are preferably metal tubing of 2 inch by 1.5 inch rectangular construction which extend vertically downwardly from the side rails 46,48 to the ends of the strut 54.

The tongue 30 extends outwardly from the front end 44 of the trailer 20 approximately 40 inches. The tongue 30 is preferably constructed of 3 inch by 2 inch rectangular metal tubing. A hitch 60 is mounted at the end of the tongue 30 for connection to a ball on a towing vehicle, as best illustrated in FIGS. 1 and 2.

As best illustrated in FIG. 6, supports 62,64 extend diagonally between the front rail 42 and the tongue 30 for providing side-to-side rigidity to the tongue 30. The supports 62,64 may comprise "L"-shaped metal members welded to the tongue 30 and front rail 42.

In addition, a stop 66 is preferably positioned above the front rail 42. The stop 66 is a section of metal tubing extending across the front end 44 of the trailer 20 above the front rail 42. Preferably, the stop 66 is a length of 2 inch by 1.5 inch rectangular tubing mounted on three support columns 68,70,72 constructed of the same material. The columns 68,70,72 are approximately 7 inches in length, thus supporting the stop 66 the same distance above the front rail 42. Notably, the stop 66 is shorter than the front rail 42, preferably being no longer than the distance between the side rails 46,48.

As illustrated in FIG. 6, the rear section 24 of the trailer 20 is of a similar construction to the front section 22. The rear frame section 34 includes side rails 74,76 (see also FIGS. 1 and 2). Preferably, these side rails 74,76 are constructed of rectangular 3 inch by 1.5 inch metal tubing as well, and have a length of 50–70, and most preferably 62, inches.

The rear bed section 32 comprises a flat surface or support 78 mounted to the rear frame section 34. The support 78 preferably has the same width as the support 50, with the rails 74,76 spaced apart by the same distance as the rails 46,48 of the front section 22. The support 78 is preferably a flat metal plate having a length equal to the length of the side rails.

A wall 80 extends upwardly from the sides of the support 78 to the side rails 74,76. The wall 80 has the same height as the wall 52 of the front section 22, or approximately 4 inches. The wall 80 may be constructed with the support 78 or separately therefrom. The top edge of the wall 80 is preferably welded to the respective rail 74,76. As with the front section 22, the support 78 is positioned below the side rails 74,76.

The rear frame section 34 also preferably includes a first strut 82, second strut 84 and third strut 86 (see FIGS. 1 and 2 and 6). The first strut 82 preferably spans the bottom of the support 78 at a first end of the rear section 24 of the trailer. The strut 82 comprises an "L"-shaped metal member having 2 inch by 2 inch sides.

The ends of the strut 82 are connected to the side rails 74,76 of the rear frame section 34. In particular, end columns 88,90 extend between the rails 74,76 and the strut 82. Preferably, the end columns 88,90 (see FIGS. 1 and 2 and 6) are metal supports of 2 inch by 1.5 inch tubular construction. A top end of each column 88,90 is located above the top surface of the rail 74,76 to which it is attached.

A second of the struts 84 preferably spans the bottom of the support 78 midway along the length of the support 78. This strut 84 is also of 2 inch by 2 inch "L"-shaped metal.

As illustrated in FIG. 2, the last strut 86 is preferably a similar length of material spanning the bottom the support 78 at the rear end 92 of the trailer 20. The ends of this strut 86 are also connected to the side rails 74,76, preferably by end pieces 94,96 (element 96 being located on the opposite side of the trailer but not shown). The end pieces 94,96 are segments of metal tubing joined to the rear bed section 32 and third strut 86. The end pieces 94,96 both preferably extend below the bottom surface of the support 78 by the same distance as the strut 86, or about 2 inches.

The axle 36 is of well-known construction, including wheels mounted at the ends of an elongate shaft extending beneath the support 78 of the rear section 24 of the trailer 20. The axle 36 is preferably connected to the trailer 20, and includes springs connected to the axle 36 and lugs 98 mounted on the trailer 20. A wheel shroud may be positioned over each wheel.

To comply with motor vehicle laws, tail lights 100 may be mounted on either side of the trailer 20 at a rear end 92 thereof. The tail lights 100 are positioned on supports extending outwardly approximately 7.5 inches from the side rails 74,76. The lights 100 are preferably electrically operated running and brake lights, as are well known in the art.

As best illustrated in FIGS. 1, 2 and 6, means are provided for detachably and rotatably connecting the front and rear sections 22,24 of the trailer 20 at the part line. Preferably, these means comprise pairs of hinges 38a,b, 40a,b.

The first or top pair of hinges 38a,b are positioned on a top portion of the respective frame sections 28,34 of the front and rear sections 22,24 of the trailer 20. In general, each hinge 38a,b has a first portion mounted on the front trailer section 22 for engagement with a second portion mounted on the rear trailer section 24. The following is a description of one of the hinges 38b, it being understood that the other hinge 38a is identical, but located on the opposite side of the trailer.

A pair of flanges 102a,b extend diagonally upwardly and outwardly on either side of the side rail 48 of the front trailer section 22 from the column 58. Each flange 102a,b comprises a flat section of metal connected, such as by welding, to the rail.

A central mounting hole 104a,b extends through each flange 104a,b. The holes 104a,b are positioned for alignment with a mating bore 106 extending through the corresponding column 88 on the rear section 24 of the trailer 20. As illustrated, the length and position of the flanges 102a,b are selected for alignment with the portion of the support column 88 which extends upwardly beyond the side rail 76 of the rear section 24 of the trailer 20.

The holes 104a,b in the flanges 102a,b and the bore 106 in the support column 88 are sized for acceptance therethrough of a suitable pin 108. The pin 108 preferably has an enlarged head and, in order to selectively retain the pin 108 in engagement within these members, may be adapted for use with a cotter pin 110 or similar locking element.

The second set of hinges 40a,b are preferably positioned directly vertically below the first set of hinges 38a,b. Each of these hinges 40a,b has a first portion mounted on the front trailer section 22 for engagement with a second portion mounted on the rear trailer section 24. One of the hinges 40b will be described here in conjunction with FIG. 6, it being understood that the other hinge 40a is identical, but located on the opposite side of the trailer 20.

A pair of flanges 112a,b extend horizontally outwardly from the bottom end of the column 58 of the front frame section 28. Preferably, the flanges 112a,b are flat metal members connected to and extending from the opposite sides of the column 58.

A central mounting hole 114a,b extends through each flange 112a,b. The central mounting hole 114a,b and the position and size of the flanges 112a,b are chosen for alignment with a mating bore 116 extending through the bottom end of the end column 88 of the rear section 24 of the trailer 20.

Preferably, the mounting holes 114a,b and bore 116 are sized to accept a suitable pin 118 similar to the pin 108 described above, for use with a similar cotter pin 120.

The trailer 20 preferably includes means for moving the front and rear sections 22,24 towards and away from one another. In the preferred embodiment, this means comprise a winch 130.

Referring to FIGS. 1, 2 and 6, the winch 130 is of the type well known in the prior art. The winch 130 may be manually operable, or electrically or hydraulically operated. In general, the winch 130 comprises a take-up reel 132 rotatably connected to a mounting block 134. The mounting block 134 is preferably positioned about 15 inches in front of the front rail 42 on the tongue 30. The winch 130 preferably has at least a 600 pound capacity.

The winch 130 further includes a cable 136 having one end connected to the take-up reel 132 and a hook 138 mounted at its opposite end. The cable 136 may comprise a steel cable, wire, rope or other elongate and relatively flexible member.

As illustrated in FIGS. 3–5, wheels 140 are included for selective connection to the trailer 20. Preferably, there are a total of four wheels 140 (two for mounting on each side of the trailer). Each wheel 140 is approximately 3 inches in diameter and includes an outwardly extending pin or axle for extension through the bore 116 in each column 88,90 or holes 114a,b through the flanges 112a,b, as the case may be.

Use of the trailer 20 of the present invention will now be described.

Referring to FIG. 1, in a first position, for use in hauling an item such as a motorcycle 122, the front and rear sections 22,24 of the trailer 20 are joined so as to form a trailer structure having a contiguous bed. In this position, the pins 108,118 pass through the respective aligned mounting holes 104a,b, 114a,b and bores 106,116. In this fashion, the end columns 88,90 of the rear frame section 34 abut the columns 56,58 of the front frame section 28. At the same time, the flat supports 50,76 of the front and rear sections 22,24 abut, forming the bed surface.

When in this position, a user may connect the hitch 60 of the tongue 30 to a ball of a towing vehicle for towing the trailer.

The user may move the trailer 20 into a second position, as best illustrated in FIG. 2. Here, a user removes the pins 108 which form a part of the first set of hinges 38a,b. In other words, the user disconnects the top-most set of hinges 38a,b on the trailer 20.

When the first set of hinges 38a,b are disconnected, the rear section 24 of the trailer 20 may rotate about the other set of hinges 40a,b with respect to the front section 22 of the trailer. Thus, the rear end 92 of the trailer rotates downwardly until the end pieces 94,96 contact the ground, as illustrated in FIG. 2.

In this position, the rear section 24 of the trailer 20 forms a ramp to the bed section 26 of the front section 22 of the trailer. This trailer 20 orientation allows a user to utilize the rear section 24 "ramp" to roll or move items onto or off of the trailer. Once the items are loaded or unloaded, the user may raise the rear section 24 of the trailer 20 and reconnect it, as illustrated in FIG. 1.

In the event that a user has difficulty raising or lowering the rear section 24 of the trailer 20 with respect to the front section 22, the user may utilize the winch 130. The user extends the cable 136 from the reel 132, hooking the hook 138 to the rear end 92 of the trailer 20. The user then either reels in the cable 136 to raise the rear section 24 of the trailer, or lets cable out to lower the rear section of the trailer.

A user may move the trailer 20 into yet another configuration, as best illustrated in FIGS. 3–5. Here, a user removes the pins 118, thus disconnecting the lower or second set of hinges 40a,b. The user preferably connects the hook 138 on the winch cable 136 to the rear end 92 of the trailer 20.

The user raises the rear section 24 of the trailer 20 towards the front section 22 until there is a gap of about 4–5 inches between the flanges 112a,b and the columns 88,90, as illustrated in FIG. 3. At this time, the user installs the wheels 140, one each through the mounting bore 116 in each column 88,90 and one each through the holes 114a,b in the flanges on each side of the trailer 20. The user presses the axle of each wheel 140 through the appropriate hole(s) or bore, and then positions a retainer (such as a cotter pin) on the end of the axle opposite the wheel to prevent removal of the wheel.

The user then continues to reel in the cable 136 with the winch 130. As illustrated in FIG. 4, the front and rear sections 22,24 rotate upwardly towards one another. Eventually, the wheels on the axle 36 are lifted out of contact with the ground, with the entire trailer 20 supported on the four wheels 140. The user rotates the front section 22 and rear sections 24 towards one another until the stop 66 rests on the support 78 or bed of the rear section. In this position, the tongue 30 extends outward of the rear end 92 of the trailer 20.

As further illustrated in FIG. 5, when the front section 22 of the trailer 20 is folded over the rear section 24, the wheels 140 support the trailer 20 in a vertical position. Moreover, the wheels 140 allow a user to move the trailer 20 easily in any direction.

The user may likewise utilize the winch 130 to lower the front and rear sections 22,24 back to the position illustrated in FIG. 1. Of course, the user must remove the wheels 140 and rejoin the bottom pair of hinges 40a,b can be reattached.

The advantages of the trailer 20 of the present invention are numerous. First, the trailer 20 of the present invention has the utility of a normal trailer when the front and rear sections 22,24 are joined. Second, when the rear section 24 of the trailer 20 is tilted downwardly, a ramp is formed. This eliminates the problems associated with loading and unloading regularly configured trailers.

Lastly, the trailer 20 may be folded so as to reduce its total length. This feature is particularly advantageous when a user wishes to store the trailer. By way of specific example, in the trailer 20 configuration described above, the rear section 24 has a total length of approximately 62 inches, and the front section 22 (including the tongue) a length of approximately 86 inches. Thus, in its connected position, the total length of the trailer is 148 inches, or more than twelve feet. When folded, however, the total length of the trailer is 88 inches, or only slightly over seven feet.

In this instance, the total length of the trailer 20 is shortened to a length which would allow, in a standard eight foot ceiling home, the user to store the trailer in upright fashion in garage. In the upright state, the trailer 20 takes up very little room.

Advantageously, these varying positions are achievable with a trailer design in which the trailer has only two sections which are connectable, disconnectable and rotatable about a single part line.

While it is preferred that the trailer 20 include a winch 130, it is possible to move the trailer between its various configurations by hand.

Many variations of the trailer 20 of the present invention are possible. For example, as illustrated in FIG. 1, when hauling a motorcycle 122, it may be desirable to include a front wheel guide 124 in the front bed section 26 of the front section 22 of the trailer 20. Further, rings may be mounted on the rails of the trailer for engagement with straps 126,128 for tying the motorcycle to the trailer.

The bed and frame of the trailer 20 need not have the identical configuration described above. For example, the bed of the trailer 20 described above is generally flat, and useful in hauling a variety of items. It may be desirable to customize the configuration of the bed for hauling specific items. For example, the bed may be designed with a "C" or slight "V" shape (as viewed from the ends) for hauling motorcycles, personal watercraft or the like.

The means for movably joining the front and rear sections 22,24 of the trailer 20 may vary from the hinges 38a,b, 40a,b described above. For example, a cylindrical pin might extend inwardly from each front section 22 side rail 46,48 for selective engagement and rotation within mating sockets on the rear section 24.

The hinges 38a,b, 40a,b also need not be oriented exactly as described above, especially if the trailer 20 is configured differently. For example, if the bed did not have an upwardly extending wall, the elements forming the hinges 38a,b, 40a,b could be mounted directly to the top and bottom surface of the bed. Such could be accomplished by welding diagonally extending pairs of flanges to the top and bottom of the bed on each of the front and rear sections 22, 24 for engagement with one another. The hinges 38a,b, 40a,b do not necessarily need to be positioned above and below the bed of the trailer 20, as long as they are configured to allow the trailer to be moved between the above-stated configurations.

The particular dimensions and materials selection of the components of the trailer 20 as described above may vary as well. The trailer could also be supported by more than one wheeled axle too.

Preferably, the configuration of the trailer 20, including the means for movably joining, is simply such that the trailer has two portions on opposite sides of a single part line which can be oriented into the positions described above.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A trailer comprising:

a front trailer section having a front bed section mounted to a front frame section and having an elongate tongue for connection to a towing vehicle extending therefrom, said front trailer section having a top portion and a bottom portion;

a rear trailer section having a rear bed section mounted to a rear frame section, said rear frame section connected to a wheeled axle, said rear trailer section having a top portion and a bottom portion;

a first means for rotatably connecting said front and rear trailer sections at the top portions thereof;

a second means for rotatably connecting said front and rear trailer sections at the bottom portions thereof; and wherein one of said means for rotatably connecting said front and rear trailer sections is detachable thereby permitting one of said bed sections to move relative said other bed section.

2. The trailer of claim 1, wherein said front trailer section has a front end and a rear end, and said rear trailer section has a front end and a rear end, and wherein said first and second means for rotatably connecting are located at said rear end of said front trailer section and said front end of said rear trailer section.

3. The trailer of claim 1, wherein said first means for rotatably connecting comprises a hinge.

4. The trailer of claim 1, wherein said first means for rotatably connecting comprises a pair of hinges, one each of said pair of hinges positioned on opposite sides of said trailer sections.

5. The trailer of claim 1, wherein said second means for rotatably connecting comprises a hinge.

6. The trailer of claim 1, wherein said second means for rotatably connecting comprise a pair of hinges, one each of said pair of hinges positioned on opposite sides of said trailer sections.

7. The trailer of claim 1, wherein each of said first and second means for rotatably connecting comprise a hinge, said hinge comprising a pin for engagement with a member on said front trailer section and for engagement with a member on said rear trailer section.

8. The trailer of claim 7, wherein said member on said front trailer section comprises a pair of spaced flanges each having a mounting hole therethrough and said member on said rear trailer section comprises a column having a bore therethrough, said column adapted for positioning between said flanges for alignment of said holes and bore.

9. The trailer of claim 1, wherein said first means for rotatably connecting is positioned above a flat support surface of said front and rear bed sections, and said second means for rotatably connecting is positioned below said flat support surface of said front and rear bed sections.

10. An improved trailer, comprising:
a frame;
a bed connected to said frame, said bed having a front section and a rear section;
a tongue extending forwardly of said front section of said bed;
at least one wheeled axle connected to said frame; and
means for detachably and rotatably connecting said front and rear sections of said bed, whereby said bed may be moved into a first position in which the front section thereof is positioned over the rear section or the rear section is tilted downwardly with respect to the front section.

11. The trailer of claim 10, wherein said means for detachably and rotatably connecting comprises at least one hinge.

12. The trailer of claim 10, wherein said means for detachably and rotatably connecting comprises a first pair of hinges positioned on a top side of said bed and a second pair of hinges positioned on a bottom side of said bed.

13. The trailer of claim 12, wherein each hinge of said first and second pairs of hinges comprise a first member positioned on said front section of said bed and a second member positioned on said rear section of said bed.

14. The trailer of claim 13, wherein said first member comprises a pair of spaced flanges and said second member comprises a column for positioning between said flanges.

15. A trailer comprising:
a bed including an elongate tongue for connection to a towing vehicle and at least one wheeled axle, said trailer further including a part line, said part line dividing said bed into a front section and a rear section, and further including a first means for detachably and rotatably connecting said sections at said part line at a top portion of said bed and a second means for detachably and rotatably connecting said sections at said part line at a bottom portion of said bed.

16. The trailer of claim 15, further including a winch, said winch being coupled with said tongue.

17. The trailer of claim 15, further including a number of wheels for selective attachment to said front and rear sections of said trailer adjacent said part line.

18. The trailer of claim 15, wherein said second means for detachably and rotatably connecting said sections comprises a pair of hinges, each hinge comprising a first member having a bore passing therethrough, said first member positioned on said front section of said bed and a second member having a bore passing therethrough, said second member positioned on said rear section of said bed, said first and second members connectable via a pin passing through said bores.

19. The trailer of claim 18, further including a wheel for selective connection to said first and second members.

* * * * *